No. 872,428. PATENTED DEC. 3, 1907.
W. JAMIESON.
MACHINE FOR CLAMPING TOGETHER PIECES OF WOOD.
APPLICATION FILED FEB. 5, 1906.
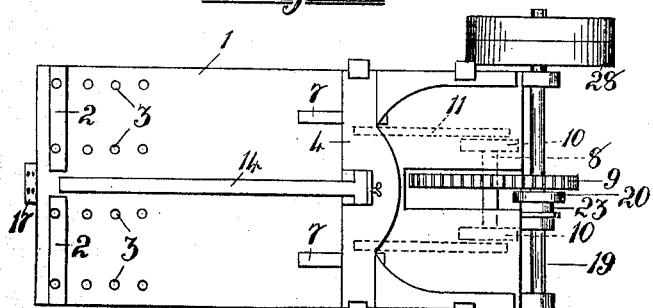
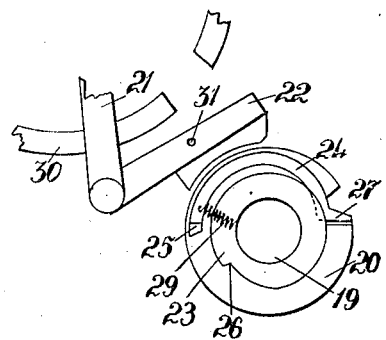
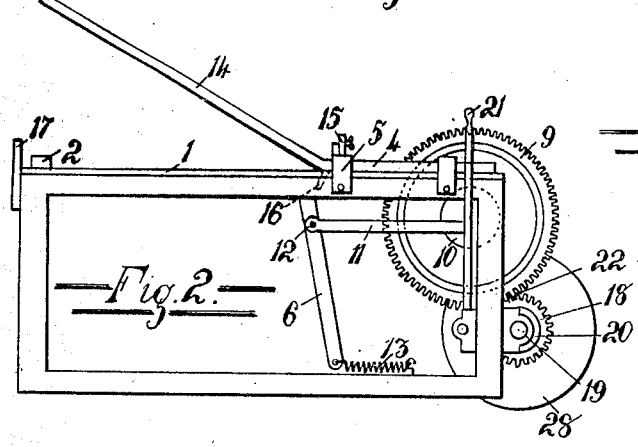
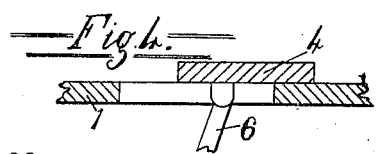
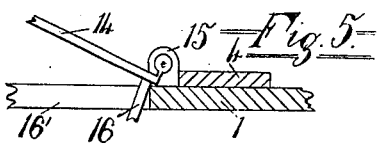
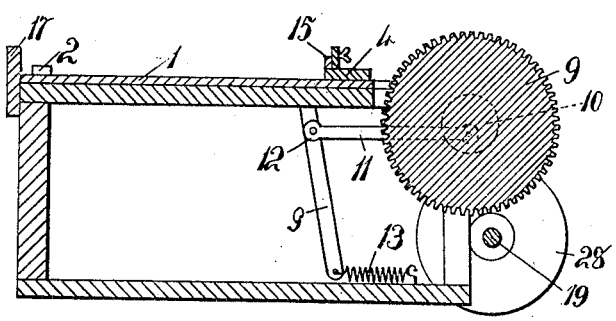
Witnesses
A. H. Gibson.
Howard Leslie Wilson.
Inventor
William Jamieson
per. George Hughes
Attorney
THE NORRIS PETERS CO., WASHINGTON, D. C.

UNITED STATES PATENT OFFICE.

WILLIAM JAMIESON, OF GRAYS, ENGLAND.

MACHINE FOR CLAMPING TOGETHER PIECES OF WOOD.

No. 872,428.　　　　Specification of Letters Patent.　　　　Patented Dec. 3, 1907.

Application filed February 5, 1906. Serial No. 299,656.

*To all whom it may concern:*

Be it known that I, WILLIAM JAMIESON, a subject of the King of the United Kingdom of Great Britain and Ireland, residing at 52 New Road, Grays, in the county of Essex, in that part of the United Kingdom called England, have invented new and useful Improvements in Machines for Clamping Together Pieces of Wood or other Material, of which the following is a specification.

This invention relates to improved means for clamping or pressing together pieces of wood which have previously been either tongued and grooved, or the edges simply glued—or for the purpose of inserting dowel pins so as to hold the several pieces of wood together to form a larger piece. Such work is required for the purpose of forming the heads and bottoms of casks, barrels or the like, also for forming the lids, bottoms, sides or ends of boxes and cases.

The invention is also usable for putting together pieces to form panels and the like, and can also be adapted to the use of bookbinders and others for the purpose of holding together a number of sheets of paper or the like so that they may be sewed or stitched while in a compressed form—or glue applied—or for any similar purpose.

The chief feature of the apparatus is the manner in which it automatically adapts itself to varying thicknesses or widths of the material being operated on. And in order that the invention may be more readily understood I make reference to the accompanying drawings in which Figure 1 is a plan of a machine constructed according to this invention. Fig. 2 is an elevation of the same. Fig. 3 is an enlarged elevation of the clutch. Fig. 4 is a longitudinal section showing the connection of parts 4 and 6. Fig. 5 is a longitudinal section showing the relation of parts 1, 4, 14, 15, 16, 16¹. Fig. 6 is a longitudinal section of machine through the center of width of table 1.

Like reference numbers refer to corresponding parts in all the figures.

1 is a flat table or bed, on which the material to be clamped is placed up to the fixed stop pieces 2. These stop pieces may be adjusted so as to accommodate smaller work by removing them and refixing them in the screw holes 3.

4 is a movable presser bar extending across the table 1 and guided so as to be slid parallel with the sides of the table 1 by the guides 5. To the underside of the bar 4 are pivoted the upper ends of two hanging levers 6, slots 7 being provided in the table 1 to allow these upper ends to slide along in the table 1.

8 is a driving shaft carrying the spur wheel 9 and at each end a crank disk 10 to which cranks are attached the connecting rods 11 the other end of the connecting rods being pivotally attached to the levers 6 by a pin at 12. At the lower end of lever 6 is attached one end of a strong spring 13, the other end of which is secured to the framework of the machine.

It will be seen that the lever 6 has no fixed (or immovable) fulcrum, but the point 12 has a definite motion according to the throw (or distance from the center) of the pin of the disk crank 10 which operates the connecting rod 11, the other two points of the lever 6— that is to say—where it is attached to the bar 4—and where it is attached to the spring 13—are not otherwise fixed, the object being that when material is placed on the table 1 of such a size or of such solidity that it prevents the bar 4 from moving—or only moving a very little—the end of the lever 6 to which is attached the spring 13 takes up the motion imparted by the connecting rod 11 and expands the spring 13. If however from the nature of the material being dealt with, the bar 4 can move forward it will do so without moving the spring 13, which is of such a strength as to allow the required amount of pressure to be applied to the material being dealt with before the spring expands. Therefore notwithstanding varying widths of material or varying degrees of solidity, each will receive the same, or nearly the same pressure.

The machine is operated by the belt pulleys 28 fixed on the shaft 19 on which is mounted a clutch and the smaller toothed or spur wheel 18 which gears with the larger one 9, the spur wheel 18 and the disk 20 of the clutch being attached to each other but free to run loosely on the shaft 19. The disk 23 however is fastened to the shaft 19.

The disk 20 carries the piece 24 provided with a projection 25 which in a certain position of the parts is caused by the spring 29 to engage with a notch 26 on the disk 23. At the opposite end of the piece 24 is another projection 27 which passes through a gap or slot 27ᵃ in the disk 20. A shoe 22 worked by the hand lever 21, rests on the edge of the disk 20 and when it is in that position it causes the projection 27 to be pressed in flush with the edge of the disk 20 and so lift the piece 25 out of the notch 26 whereupon the disk 20 and the spur wheel 18 will come to rest.

On the shoe 22 being raised by means of the hand lever 21, the projection 27 will rise, and the projection 25 will be pulled inwards by the spring 29 until it enters the notch 26. The machine would then commence to operate.

In order that the machine may be caused to perform one revolution only and then stop—a ring 30 is placed round the face of the wheel 9 and a pin 31 fixed in the shoe 22. The ring 30 is incomplete owing to there being in it a short gap or open space through which the pin 31 can pass on to the upper side of the ring 30 on which it rests and holds up the shoe from the disk 20 until the wheel 9 has performed one revolution, or until the gap or open space on the ring 30 comes round opposite the pin 31 and allows it to fall through and thereby stop the machine.

To prevent the material which is being operated on from rising from the table when pressure is applied, a bar 14 is hinged to a block 15 attached to the bar 4 and 14 has a short arm 16 projecting at right angles to itself through a slot 16ª in the table 1 the slot being so situated that when the bar 4 is furthest back, the arm 16 will strike the end of the slot and tilt up the bar 14. When however the bar 4 commences to move forward this pressure is relieved and the bar 14 falls down on the table, the free end of it passing through a hole in the catch piece 17 which then holds it.

What I claim as my invention and desire to secure by Letters Patent is:—

In a machine for clamping together pieces of wood and other material, the combination of a table supported on a suitable frame, a driving shaft carrying a spur wheel meshing with a spur-wheel on another shaft which also carries two crank disks to which are attached the corresponding ends of two connecting rods, the other ends of which are pivoted to two hanging levers which at their lower ends are spring controlled and at their upper ends pivoted to a presser board arranged to slide on the top of the table, a bar hinged to the presser bar and having a small arm free to move in a slot in the table, removable stops being provided on the table to accommodate the machine to various dimensions of material, and the driving shaft carrying a clutch for giving intermittent movement to the machine substantially as hereinbefore described.

In testimony whereof I have signed my name to this specification in the presence of two subscribing witnesses.

WILLIAM JAMIESON.

Witnesses:
 WILLIAM CROSSLEY,
 FREDERICK G. PARACCO.